United States Patent [19]
Ozaki et al.

[11] Patent Number: 5,937,268
[45] Date of Patent: Aug. 10, 1999

[54] SINTERED SLIDING MEMBER AND PRODUCTION METHOD THEREOF

[75] Inventors: Kouki Ozaki; Koichi Yamamoto; Takayuki Shibayama, all of Nagoya, Japan

[73] Assignee: Daido Metal Company Ltd., Nagoya, Japan

[21] Appl. No.: 08/796,383

[22] Filed: Feb. 4, 1997

[30] Foreign Application Priority Data

Feb. 29, 1996 [JP] Japan .................................. 8-071267

[51] Int. Cl.⁶ ................................................. B22F 3/00
[52] U.S. Cl. ........................... 428/552; 428/553; 419/8; 419/12; 419/13
[58] Field of Search .................... 428/552, 553; 419/8, 12, 13

[56] References Cited

U.S. PATENT DOCUMENTS

| 4,485,147 | 11/1984 | Nishino et al. | 419/47 |
| 4,671,491 | 6/1987 | Kuroishi et al. | 428/679 |
| 5,545,249 | 8/1996 | Tanaka et al. | 75/246 |

FOREIGN PATENT DOCUMENTS

| 2091026 | 1/1972 | France . |
| 2155765 | 6/1972 | Germany . |
| 54-128923 | 5/1979 | Japan . |
| 60-215736 | 11/1985 | Japan . |
| 60-221557 | 11/1985 | Japan . |
| 61-044152 | 3/1986 | Japan . |
| 2-077552 | 3/1990 | Japan . |
| 2-290905 | 11/1990 | Japan . |
| 4-191343 | 7/1992 | Japan . |

*Primary Examiner*—Sikyin Ip
*Attorney, Agent, or Firm*—Browdy and Neimark

[57] ABSTRACT

A sintered sliding member having not only excellent in wear resistance but also low in attacking property against a mated member. To obtain the member, 0.1 to 3.5 wt. % h-BN and 0.1 to 3.5 wt. % graphite are mixed in a matrix material of iron-based powder containing chromium, and a resultant powder mixture is compacted to form a compact. The compact is sintered while bringing the compact into contact with copper or copper alloy so that the copper or copper alloy is infiltrated simultaneously with the sintering. In this way, the copper phase is filled in the iron-based matrix and the h-BN is distributed in the copper phase. Graphite reacts with chromium to be precipitated as chromium carbide in and/or near boundaries defined between the matrix and the copper phase.

8 Claims, 1 Drawing Sheet

SINTERED SLIDING MEMBER AND PRODUCTION METHOD THEREOF

BACKGROUND OF THE INVENTION

1. Field of the Invention

The present invention relates to a sintered sliding member, in particular a sliding member for high temperatures, and a production method thereof.

2. Description of the Related Art

As a sliding member used under high temperatures, a sintered sliding member comprising an ironbased alloy matrix containing chromium, for instance, metal alloy such as stainless steel, excellent in thermal resistance and oxidation resistance, into which matrix are distributed solid lubricants such as carbon or h-BN (hexagonal boron nitride particles), is known in JP-A-54-128923 Publication and JP-A-60-221557 Publication.

In JP-A-60-215736 Publication, JP-A-2-290905 Publication and JP-A-4-191343 Publication, there are disclosed inventions in which the pore of sintered body is infiltrated with copper to thereby promote the mechanical strength and oxidation resistance.

According to the invention disclosed in JP-A-60-215736, a compact is formed with alloy steel powder (matrix material) containing 2.5 to 25 wt. % chromium and 0.2 to 3.0 wt. % carbon, the compact being then sintered at a temperature higher by 0 to 50° C. than the liquid phase-occurring temperature of the alloy steel powder while it is kept in contact with copper-based metal so that the copper-based metal is infiltrated into the compact, thereby obtaining a sintered alloy excellent in wear resistance.

In JP-A-2-290905 Publication, there is disclosed a sliding member produced by the steps of mixing metal powder and a solid lubricant such as graphite, compacting and sintering the mixture to thereby obtain a compact, and infiltrating a low melting-point metal such as copper into the compact to thereby produce the sliding member.

In JP-A-60-215736 Publication among the conventional techniques mentioned above, however, a compact is made of alloy steel powder containing 0.2 to 3.0 wt. % of carbon. In this compact, carbon is chemically combined with chromium during sintering to thereby become very hard chromium carbides, which hard carbides are precipitated into the matrix of alloy steel to thereby achieve the enhancement of wear resistance. In consequence, the hard carbides increase the attacking property against a mated member, so that the application thereof to a soft mated member especially of not more than 300 Hv has been difficult.

Further, in JP-A-2-290905 Publication, since no chromium acting as a carbide forming element is contained and since graphite of as large an amount as 10 wt. % is mixed in, the added graphite does not become hard carbides and free graphite exists. That is, this conventional technique is intended to improve the sliding characteristics such as frictional coefficient by using the free graphite as a solid lubricant. Thus, when used in the oxidation atmosphere, free graphite is rapidly oxidized, so that this technique was inapplicable as a sliding member for high temperatures.

SUMMARY OF THE INVENTION

It is an object of the present invention to provide a sintered sliding member for high temperatures which has excellent wear resistance and is low in attacking property against a mated member under high temperature.

The sintered sliding member according to the first aspect of the invention comprises an iron-based matrix containing chromium which matrix is filled with a copper phase, the copper phase having h-BN particles dispersed therein, the sliding member further containing chromium carbide precipitated in and/or near boundaries defined between the matrix and the copper phase.

The matrix is made of an iron-based alloy containing chromium, which matrix is excellent in oxidation resistance at high temperatures and which matrix forms a carbide brought about by graphite mixed therewith.

The chromium content of the matrix material is preferably 11 to 27 wt. % from the viewpoint of oxidation resistance. The chromium content lower than 11 wt. % provides insufficient oxidation resistance and difficulty in the formation of the carbide from graphite. On the other hand, a chromium content more than 27 wt. % is not preferable from the standpoint of compacting property (compactibility).

The copper phase is made of pure copper or copper alloy. Copper alloy containing 2.8 wt. % Co and balance Cu, or alternatively containing 1.5 wt. % of Fe, 1.0 wt. % of Mn, 1.1 wt. % of Zn and balance of Cu, and so on is usable according to the need.

Copper alloys containing Co improve the infiltration, whereas Cu-Fe-Mn-Zn alloys improve the mechanical strength.

Regarding the amount of the copper phase, 10 to 25 area % is preferable. In a case of less than 10 area %, the copper phase acting to form carbides becomes insufficient in amount, so that the formation of a carbide becomes difficult and the enhancement of antiseizure property is not expectable. On the other hand, in the case of more than 25 area %, the mechanical strength lowers. Considering the formation of a carbide and the mechanical strength, 13 to 23 area % is more preferable.

Regarding the amount of h-BN, in a case of less than 0.5 area % of h-BN, no sufficient lubricating operation can be obtained, whereas embrittlement and lower oxidation resistance occur in the case of more than 10 area % of h-BN. Thus, the amount of h-BN is 0.5 to 10 area %. A uniform distribution of h-BN in the copper phase brings about excellent mechanical properties and lubricating performance. In particular, 1 to 8 area % h-BN is preferable. Further, in a case where the diameter of the h-BN is more than 100 μm, the infiltration property of copper tends to lower. From this respect, it is especially preferable for the h-BN particles to have a size not more than 100 μm and to be uniformly distributed.

Chromium carbides are precipitated in and/or near the boundary between the matrix and the copper phase. The carbides are formed by the combining of the mixed graphite with chromium in the matrix during the sintering step. In a case where the amount of the chromium carbide particles is less than 3 area %, no sufficient wear resistance can be obtained, whereas the attacking property against a mated member tends to increase in the case of more than 24 area % of chromium carbide. Thus, 3 to 24 area % of the carbides is preferable. As the carbon component forming the carbide, graphite is preferable from the standpoint of the carbide formation. In a case of less than 0.1 wt. % of graphite, the formation of a carbide becomes difficult, whereas in the case of more than 3.5 wt. %, free graphite remains and oxidation resistance lowers. Thus, a graphite amount of 0.1 to 3.5 wt. % is preferable and 0.2 to 3.0 wt. % is more preferable.

As disclosed in prior art, in a case where a matrix material in which carbon has previously been alloyed is used, carbides are precipitated in a relatively hard matrix, thereby enhancing the friction coefficient and wear resistance but, on the other hand, increasing the attacking property against a mated member. In the present invention, hard chromium carbides are precipitated in and/or near the boundaries between the matrix and the copper phase and the carbides are surrounded by a soft softer copper phase, so that the copper phase acts as a cushion for the carbides. In contrast, carbide harder in hardness than copper, precipitated in the matrix, brings about no cushion action, so that no good sliding characteristic (which is obtained according to the present invention) can be obtained in this halter case.

Fine grains on the order of 1 to 10 µm size are preferable for the chromium carbide, and coarser grains are apt to cause a larger attacking property against a mated member. Thus, 50 µm grain size or smaller of graphite to be mixed in with the matrix material is preferable.

According to the second aspect of the invention, there are provided methods for producing the sintered members.

The first method of the invention comprises the steps of: mixing a matrix material of iron-based powder containing 11 to 27 wt. % chromium with 0.1 to 3.5 wt. % h-BN and 0.1 to 3.5 wt. % graphite to thereby make a powder mixture, compacting this powder mixture to thereby form a compact, and sintering the compact while bringing the compact into contact with copper or copper alloy so that the copper or copper alloy is infiltrated into pores provided in the compact simultaneously with the sintering.

This differs from the second method of the invention in that the sintering step is performed directly after the compacting step, not through a preliminarily sintering step. This omission enables an inexpensive sintered sliding member to be produced.

A matrix material available as raw material powder for the matrix may be powder mixture made by mixing iron powder such as soft steel powder of lowcarbon content with chromium powder or chromium alloy, or alloy powder made of stainless steel previously alloyed with chromium or the like. In a case of using powder mixture, chromium a powder or chromium alloy powder is sufficiently mixed with iron powder so that no segregation takes place. In a chromium-segregated sintered body, no sufficient thermal resistance or mechanical strength can be obtained.

Accordingly, the use of alloy powder that can facilitate the mixing of the powder is preferred. Regarding the alloy powder, stainless steel powder is available. The usable stainless steels include not only austenitic stainless steel but also martensitic, ferritic and other stainless steels. A stainless steel is selected appropriately according to the hardness of a mated member, but an austenitic stainless steel containing nickel is especially preferable because it is softer than other stainless steels and excellent in thermal resistance.

Since chromium in the matrix material reacts with the graphite mixed during the sintering step to thereby form a carbide and since the chromium exists in the copper phase in a solid-solution state, 11 to 27 wt. % chromium content is preferable. A chromium content less than 11 wt. % results in deterioration in the oxidation resistance of the matrix, and a chromium content more than 27 wt. % is not preferable from the standpoint of compacting property (compactibility). Incidentally, there can be appropriately added other alloy components such as, for example, nickel for the purpose of enhancing the oxidation resistance.

In the compacting step, the porosity of a compact body is set to be 10 to 30%. A porosity below 10% causes a too small rate of infiltrated copper phase, which causes an insufficient amount of chromium carbide formation. On the other hand, a porosity above 30% causes an increase in the occupation ratio of infiltrated copper phase, which deteriorates mechanical strength. For these reasons, the porosity of the compact is set to be 10 to 30%, in particular preferably 15 to 20%.

The sintering step is carried out at a temperature not less than the melting point of the copper or copper alloy. The sintering is performed under a reducing atmosphere and/or a reduced pressure. Copper or copper alloy made molten in this way is infiltrated into pores formed in the matrix. On the other hand, in a case where the temperature is too high, precipitated carbides coarsen in grain size. Thus, the sintering step is performed at a sintering temperature of 1100 to 1200° C., which range is slightly higher than the melting point of copper or copper alloy, so as to obtain carbides of fine size. Especially from the standpoint of infiltration property, a sintering temperature range of 1130 to 1170° C. is more preferable.

The second method of the invention relates to another production method of the sintered sliding material.

The second method of the invention comprises the steps of: mixing a matrix material of iron-based powder containing chromium with 0.1 to 3.5 wt. % h-BN and 0.1 to 3.5 wt. % graphite to thereby make a powder mixture; compacting the powder mixture to thereby form a compact; preliminarily sintering the compact to thereby form a preliminarily sintered body with a porosity of 10 to 30%; and sintering the compact while bringing the compact into contact with copper or copper alloy so that the copper or copper alloy is infiltrated into pores provided in the compact simultaneously with such sintering.

The difference between the first and second methods resides in that in the second method the preliminary sintering is performed after the compacting step and the sintering step is performed after the preliminary sintering. Because of this preliminary sintering, the powder components of the matrix material are combined with each other so that a porosity of the compact can be lowered. In consequence, the breakage resistance of the compact can be enhanced.

In addition, the preliminary sintering step is preferably performed by diffusion sintering at a relatively low temperature of 900 to 1000° C. A higher preliminary sintering temperature makes the porosity of a preliminary sintered body less than 10% and causes excessive solid dissolution of a mixed graphite into the matrix, thereby causing unfavorably much precipitation of carbide in the matrix during the sintering step. On the other hand, a lower preliminary sintering temperature causes a prolonged preliminary sintering time. For these reasons, the preliminary sintering temperature is preferably in the range of 900 to 1000° C.

As described above, in sintered sliding members according to the invention, the h-BN grains are distributed in the copper phase and/or the chromium carbide is precipitated in and near boundaries between the matrix and the copper phase, so that it becomes possible to obtain a sintered sliding member not only excellent in wear resistance but also low in attacking property against a mated member.

DESCRIPTION OF THE PREFERRED EMBODIMENTS

Figure 1:
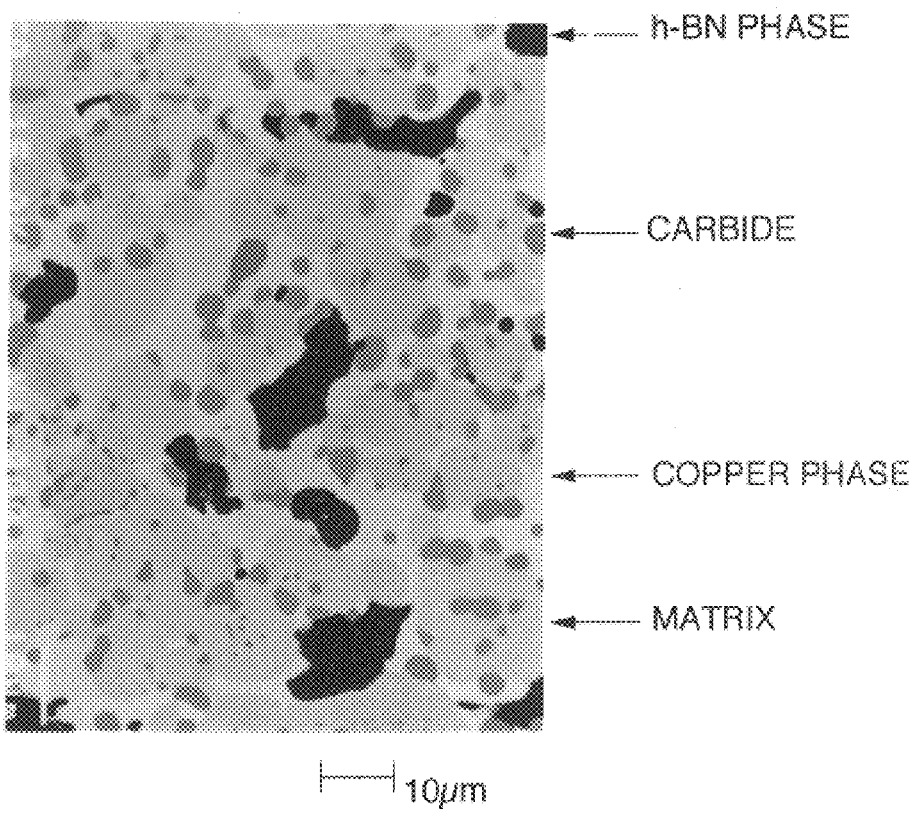
FIG. 1 is a microscopic photograph showing the structure of a sintered body according to Embodiment 3 of the invention.

Hereinafter, the present invention will be described referring to Embodiments 1 to 14 of the invention and Comparative examples 20 to 30.

Test pieces of the respective Embodiments 1 to 14 and Comparative examples 20 to 30 were prepared by powder metallurgy.

(Mix Step)

As iron-based alloy containing chromium, in Embodiments 1 to 10, Embodiments 13 and 14, and Comparative examples 20 to 28, a powder of austenitic stainless steel of SUS 310S (19 Ni–25 Cr and balance Fe and incidental impurities in wt. %) of minus 100 mesh in size (not coarser than 150 μm) was used. In Embodiment 11 there was used a powder of martensitic stainless steel SUS 410 (12.5 Cr and balance Fe and incidental impurities in wt. %) of minus 100 mesh. In Embodiment 12 there was used a powder of ferritic stainless steel of SUS 434 (17 Cr–1.0 Mo and balance Fe and incidental impurities in wt. %) of minus 100 mesh. Further, in Comparative example 29, a stainless steel powder preliminarily alloyed with 1.0 wt. % of C (18.5 Ni–22.5 Cr–1.0 C and balance Fe and incidental impurities in wt. %) of minus 100 mesh was used. Furthermore, in Comparative example 30, alloy powder consisting of 18.1 wt. % Ni–22.1 wt. % Cr–2.0 wt. % Cu–1.0 wt. % C and balance Fe and incidental impurities was used.

As h-BN, fine powder with the average particle size of 10 μm was used. In place of h-BN, 6.0 wt. % $MOS_2$ and 6.0 wt. % $WS_2$ were added as a solid lubricant in Comparative examples 27 and 28, respectively.

As graphite, powder with the average particle size of 10 μm was used.

These iron-based alloy containing chromium, h-BN and graphite were mixed at mix ratios shown in Table 1 to provide powder mixtures. In addition, to enhance the compacting property (compactivity) of the mixture, 1 wt. % of zinc stearate is mixed.

TABLE 1

| | Amount of Each Constituent of Compact (wt. %) | | | Ratio of an Infiltration Material with Respect to 100 Weight Parts of Compact Copper Alloy |
|---|---|---|---|---|
| | Iron-based alloy | Solid lubricant | Graphite | |

Embodiments of the invention

| | Iron-based alloy | Solid lubricant | Graphite | Copper Alloy |
|---|---|---|---|---|
| 1 | SUS310S balance | h-BN 0.2 | 0.2 | *1)35 |
| 2 | SUS310S balance | h-BN 0.2 | 1.0 | 35 |
| 3 | SUS310S balance | h-BN 1.0 | 1.0 | 35 |
| 4 | SUS310S balance | h-BN 2.0 | 1.0 | 35 |
| 5 | SUS310S balance | h-BN 3.0 | 1.0 | 35 |
| 6 | SUS310S balance | h-BN 1.0 | 0.2 | 35 |
| 7 | SUS310S balance | h-BN 1.0 | 1.0 | 20 |
| 8 | SUS310S balance | h-BN 1.0 | 2.0 | 35 |
| 9 | SUS310S balance | h-BN 1.0 | 3.0 | *2)35 |
| 10 | SUS310S balance | h-BN 3.0 | 3.0 | 35 |
| 11 | SUS410 balance | h-BN 1.0 | 1.0 | 35 |
| 12 | SUS434 balance | h-BN 1.0 | 1.0 | 35 |
| 13 | SUS310S balance | h-BN 1.0 | 1.0 | 20 |
| 14 | SUS300S balance | h-BN 1.0 | 1.0 | 35 |

TABLE 1-continued

| | Amount of Each Constituent of Compact (wt. %) | | | Ratio of an Infiltration Material with Respect to 100 Weight Parts of Compact Copper Alloy |
|---|---|---|---|---|
| | Iron-based alloy | Solid lubricant | Graphite | |

Comparative examples

| | Iron-based alloy | Solid lubricant | Graphite | Copper Alloy |
|---|---|---|---|---|
| 20 | SUS310S balance | — | — | 35 |
| 21 | SUS310S balance | — | 1.0 | 35 |
| 22 | SUS310S balance | h-BN 1.0 | — | 35 |
| 23 | SUS310S balance | h-BN 4.0 | 4.0 | 35 |
| 24 | SUS310S balance | h-BN 1.0 | 1.0 | 15 |
| 25 | SUS310S balance | h-BN 1.0 | 1.0 | 40 |
| 26 | SUS3105 balance | — | 6.0 | 35 |
| 27 | SUS310S balance | $MoS_2$ 6.0 | — | 35 |
| 28 | SUS310S balance | $WS_2$ 6.0 | — | 35 |
| 29 | *3)Fe—Ni—Cr—C balance | h-BN 1.0 | — | 35 |
| 30 | Fe—Ni—Cr—C—Cu balance | h-BN 1.0 | — | 35 |

*1) Infiltration materials: pure Cu
*2) Infiltration material: 2.3Fe—1.3Mn—1.2Zn - balance Cu in wt. %
*3) Iron-based alloy: alloy powder containing 18.5Ni—22.5Cr—1.0C - balance Fe in wt. %
*4) Iron-based alloy: alloy powder containing 18.1Ni—22.1Cr—2.0Cu—1.0C - balance of Fe in wt. %

(Compacting/Dewaxing Step)

Each of the powder mixtures having the respective mix ratios shown in Table 1 was compacted under a compacting pressure of 6 t/cm$^2$ (588 MPa) to thereby provide compacts with a porosity of 20% in Embodiments 1 to 12 and Comparative examples 20 to 24 and 26 to 30. In addition, compacts with porosities of 10%, 30% and 40% were obtained in Embodiments 13, 14 and Comparative example 25, respectively.

These compacts were heated to 500° C. for the dewaxing of the zinc stearate.

(Sintering/Infiltration Step)

As infiltration materials, a powder of copper alloy containing 2.8 wt. % cobalt was used in Embodiments 2 to 8 and 10 to 14 and Comparative examples 20 to 30. In Embodiments 1 and 9, pure copper powder and copper alloy powder containing 2.3 wt. % Fe–1.3 wt. % Mn–1.2 wt. % Zn were used, respectively. Such copper and copper alloy powders were compressed and compacted into a cylinder of the same diameter as the compact to thereby provide green compacts. Further, in Embodiments 1 to 6, 8 to 12 and 14, and in Comparative examples 20 to 23 and 26 to 30, infiltration material of 35 weight parts was employed with respect to 100 weight parts of compact. Furthermore, 20 parts of infiltration material for Embodiments 7 and 13, 15 parts of infiltration material for Comparative example 24, and 40 parts of infiltration material for Comparative example 25 were employed with respect to 100 weight parts of compact (see Table 1).

After each of these green compacts of copper and copper alloy was overlapped on a compact, these were sintered at 1150° C. for 60 min. in a reducing atmosphere to thereby provide a sintered body.

The porosity of the obtained sintered bodies was 3% regarding Embodiments 1 to 6 and 8 to 13 and Comparative examples 20 to 23 and 26 to 30, 10% regarding Embodiments 7 and 14, 15% regarding Comparative example 24, and 18% regarding Comparative example 25.

Next, the structure of a sintered body was microscopically observed. FIG. 1 is a microscopic photograph showing the structure of Embodiment 3, which shows a fine-grained structure with the copper phase infiltrated in the matrix, h-BN being distributed uniformly in the copper phase, and fine carbides (chromium carbide) of several gm size are precipitated in and/or near boundaries between a matrix and the copper phase.

Figure 2:
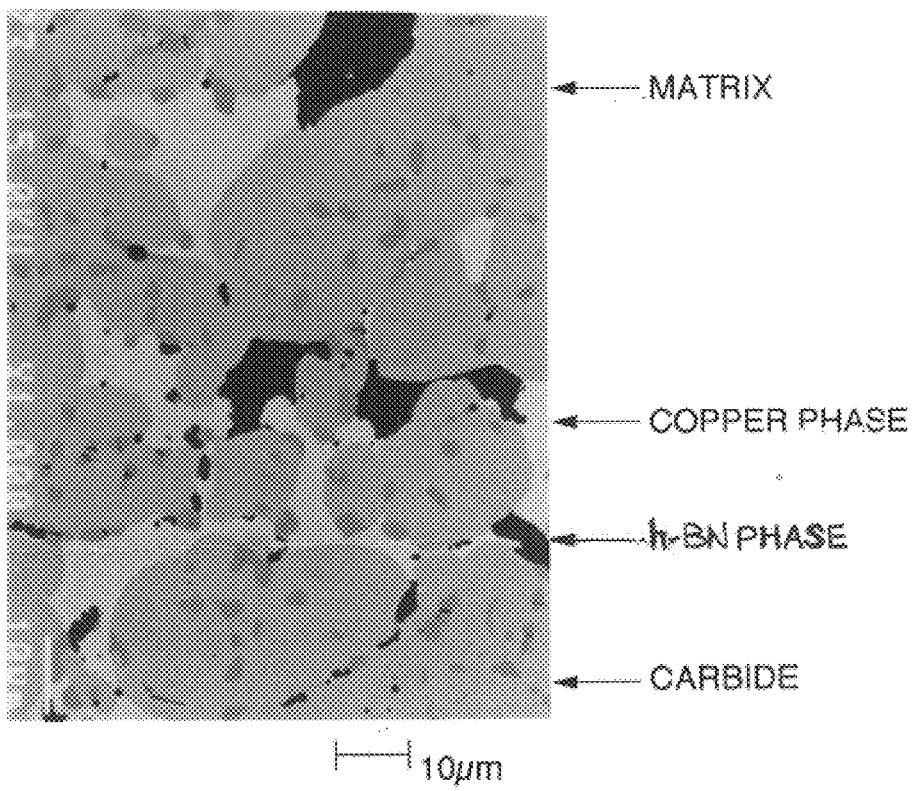
FIG. 2 is a microscopic photograph showing the structure of a sintered body according to comparative example 29.

On the other hand, FIG. 2 shows the structure of Comparative example 29 using stainless steel powder preliminarily alloyed with 1.0 wt. % C, which shows a fine-grained structure with the copper phase infiltrated in the matrix, and h-BN is distributed uniformly in the copper phase. However, fine carbide was precipitated in the matrix.

In addition, the respective areas of matrix, copper or copper alloy and h-BN were analyzed with an X-ray microanalyzer. The results shown in Table 2 were obtained.

TABLE 2

| | Area (%) of Sintered Bodies | | | | Porosity of Sintered Body (%) |
|---|---|---|---|---|---|
| | Matrix | Copper Phase | Chromium Carbide | h-BN | |
| Embodiments of the invention | | | | | |
| 1 | 80.5 | 16 | 3 | 0.5 | 3 |
| 2 | 69.5 | 16 | 14 | 0.5 | 3 |
| 3 | 65 | 17 | 15 | 3 | 3 |
| 4 | 63 | 16 | 15 | 6 | 3 |
| 5 | 60 | 17 | 14 | 9 | 3 |
| 6 | 78 | 16 | 3 | 3 | 3 |
| 7 | 72 | 10 | 15 | 3 | 10 |
| 8 | 60 | 17 | 20 | 3 | 3 |
| 9 | 56 | 17 | 24 | 3 | 3 |
| 10 | 51 | 16 | 24 | 9 | 3 |
| 11 | 71 | 18 | 8 | 3 | 3 |
| 12 | 72 | 17 | 8 | 3 | 3 |
| 13 | 73 | 10 | 14 | 3 | 3 |
| 14 | 56 | 25 | 16 | 3 | 10 |
| Comparative examples | | | | | |
| 20 | 80 | 20 | — | — | 3 |
| 21 | 69 | 17 | 14 | — | 3 |
| 22 | 81 | 16 | — | 3 | 3 |
| 23 | 46 | 17 | 25 | 12 | 3 |
| 24 | 75 | 7 | 15 | 3 | 15 |
| 25 | 52 | 30 | 15 | 3 | 18 |
| 26 | 57 | 16 | 24 | 3 | 3 |
| 27 | 70 | 17 | — | MoS$_2$ 13 | 3 |
| 28 | 70 | 17 | — | WS$_2$ 13 | 3 |
| 29 | 66 | 16 | 15 | 3 | 3 |
| 30 | 66 | 16 | 15 | 3 | 3 |

Next, regarding each of the Embodiments and Comparative examples, plate-like test pieces were prepared and various experiments were performed.

Regarding each of the Embodiments and Comparative examples, measurement of friction coefficient and wear test were performed at 500° C. and 700° C.

In the wear test, a mated member having 4 mm diameter pins of SUS 304 (9.3 Ni–19 Cr and balance Fe and incidental impurities in wt. %) with a hardness Hv of 250 was selected.

While the weight of 2 kg was applied on the mated member, reciprocating motions were repeated at a mean velocity of 1 m/min. for an hour in a surrounding atmosphere. FIG. 3 shows the results.

TABLE 3

| | Friction Coefficient | | Amount of Wear of Plate (mm$^3$) | | Amount of Wear of mated member (mm$^3$) | |
|---|---|---|---|---|---|---|
| | 500° C. | 700° C. | 500° C. | 700° C. | 500° C. | 700° C. |
| Embodiments of the invention | | | | | | |
| 1 | 0.47 | 0.41 | 0.56 | 0.48 | 0.02 | 0.01 |
| 2 | 0.43 | 0.40 | 0.55 | 0.48 | 0.04 | 0.03 |
| 3 | 0.40 | 0.34 | 0.54 | 0.47 | 0.03 | 0.02 |
| 4 | 0.38 | 0.31 | 0.56 | 0.45 | 0.02 | 0.02 |
| 5 | 0.37 | 0.30 | 0.57 | 0.47 | 0.02 | 0.02 |
| 6 | 0.43 | 0.40 | 0.56 | 0.49 | 0.02 | 0.01 |
| 7 | 0.43 | 0.41 | 0.70 | 0.68 | 0.07 | 0.05 |
| 8 | 0.45 | 0.42 | Q.46 | 0.42 | 0.04 | 0.03 |
| 9 | 0.46 | 0.44 | 0.43 | 0.40 | 0.05 | 0.04 |
| 10 | 0.34 | 0.33 | 0.71 | 0.68 | 0.06 | 0.05 |
| 11 | 0.37 | 0.36 | 0.43 | 0.41 | 0.03 | 0.02 |
| 12 | 0.35 | 0.33 | 0.41 | 0.40 | 0.04 | 0.03 |
| 13 | 0.41 | 0.35 | 0.53 | 0.46 | 0.03 | 0.02 |
| 14 | 0.38 | 0.32 | 0.72 | 0.65 | 0.04 | 0.03 |
| Comparative examples | | | | | | |
| 20 | 1.24 | 1.54 | 3.31 | 5.12 | 0.11 | 0.12 |
| 21 | 0.60 | 0.55 | 0.85 | 0.80 | 0.10 | 0.10 |
| 22 | 0.64 | 0.62 | 1.95 | 1.91 | 0.09 | 0.08 |
| 23 | 1.10 | 1.34 | 2.78 | 4.78 | 0.15 | 0.24 |
| 24 | 0.78 | 0.85 | 1.34 | 2.25 | 0.10 | 0.15 |
| 25 | 0.89 | 1.23 | 2.67 | 4.42 | 0.12 | 0.16 |
| 26 | 0.71 | 1.45 | 2.41 | 3.42 | 0.23 | 0.31 |
| 27 | 0.74 | 1.64 | 3.26 | 4.84 | 0.13 | 0.23 |
| 28 | 0.71 | 1.67 | 2.94 | 4.62 | 0.12 | 0.24 |
| 29 | 0.49 | 0.48 | 0.45 | 0.43 | 0.20 | 0.20 |
| 30 | 0.48 | 0.46 | 0.43 | 0.41 | 0.22 | 0.22 |

From the results shown in Table 3, the following was found.
(Influence of a Matrix Material)

In Comparative examples 29 and 30 in which a carbide is precipitated in matrix, not in and/or near boundaries defined between the matrix and the copper phase, the attacking property against a mated member is high, thereby increasing the wear amount of the mated member.

In contrast to Embodiments 3, 11 and 12 with iron-based alloys of SUS 310S, SUS 410 and SUS 434 used respectively, Embodiment 3 with iron-based alloy of SUS 310S exhibited a slightly high amount of plate wear, but was not greatly affected by a matrix material in sliding characteristics.
(Influence of h-BN)

In comparison with Comparative example 21 containing no h-BN, Embodiment 3 containing 1.0 wt. % h-BN brought about improvement regarding both the amount of plate wear and that of mated member wear.

In Comparative examples 27 and 28 using respectively solid lubricants of 6.0 wt. % MOS$_2$ and 6.0 wt. % WS$_2$ added in place of h-BN, no good result was obtained in any one of friction coefficient, amount of plate wear and amount of mated member wear. This is attributable to the rapid oxidation of MOS$_2$ and WS$_2$ which rapid oxidation causes the sublimation and disappearance thereof in the surrounding atmosphere above 400° C.

In all of Embodiments 2 to 5 in which 1.0 wt. % graphite, 35 wt. % copper alloy and 0.2 to 3.0 wt. % h-BN were mixed, good results were obtained. Especially with an increase in the mixed amount of h-BN, improved effects regarding both of the friction coefficient and the amount of mated member wear were obtained.

(Influence of Graphite)

In Comparative example 22 in which no graphite was mixed, the absence of carbide precipitation caused increase in all of friction coefficient and amount of plate wear.

In Embodiments 3, 6, 8 and 9, 1.0 wt. % h-BN and 35 wt. % copper alloy were mixed and the amount of mixed graphite varies from 0.2 to 3 wt. %. Also, in these Embodiments 3, 6, 8 and 9, good results were obtained. Especially with an increase in the mixed amount of graphite, the wear resistance was slightly improved, but the attacking property against a mated member exhibits an increasing tendency.

Incidentally, in Comparative example 23, since an excess amount of 4 wt. % graphite was mixed, a part of the mixed graphite remained as free graphite in a sintered body. The residual graphite was oxidized to disappear under high temperatures, this portion became a hole, thereby decreasing the mechanical strength.

Comparative example 20 containing neither graphite nor h-BN is most inferior in both wear resistance and friction characteristic. Similarly, also in Comparative example 25, a large porosity caused decrease in mechanical strength, wear resistance and friction characteristic.

(Influence of an Infiltration Material)

In Embodiments 3 and 7 and Comparative example 24, the contents of h-BN and graphite are set to be 1.0 and 1.0 wt. %, respectively, while the amount of an infiltration material is varied. In comparison between Embodiments 3 and 7, because of a higher porosity, in Embodiment 7 all of the properties tend to slightly decrease in comparison with Embodiment 3. On the other hand, in Comparative example 24, the content of copper alloy is 15 weight parts lower than the preferable range of the invention, the porosity in a sintered body was high and none of properties were sufficient.

What is claimed is:

1. A sintered sliding member comprising an iron-based matrix containing chromium, a copper phase infiltrated in the matrix, h-BN particles distributed in said copper phase, and chromium carbides precipitated in and/or near boundaries defined between the matrix and the copper phase, wherein the copper phase is present in the range of 10 to 25 areas %, the h-BN is present in the range of 0.5 to 10 area %, and said chromium carbide is a carbide precipitated by sintering to be present in a range of 3 to 24 area %.

2. A sintered sliding member according to claim 1 wherein the copper phase is present in the range of 13–23 area %.

3. A sintered sliding member according to claim 1 wherein said h-BN is present in the range of 1–8 area %.

4. A sintered sliding member according to claim 1 wherein said h-BN particles have a size not greater than 100 $\mu$m.

5. A sintered sliding member according to claim 1 wherein said chromium carbide is present in a grain size of about 1–10 $\mu$m.

6. A sintered sliding member according to claim 1 wherein said chromium is present in an amount of 11–27 wt. %.

7. A sintered sliding member according to claim 1 wherein said copper phase comprises substantially pure copper or a copper alloy containing 2.8 wt. % Co and balance Cu, or a copper alloy containing 1.5 wt. % of Fe, 1.08% of Mn, 1.1 wt. % of Zn and balance of Cu.

8. A sintered sliding member according to claim 1, said sliding member being produced by a process comprising the steps of:

mixing a matrix material of iron-based powder containing 11 to 27 wt. % chromium with 0.1 to 3.5 wt. % h-BN and 0.1 to 3.5 wt. % graphite having a grain size no greater than about 50 $\mu$m to thereby make a powder mixture;

compacting said powder mixture to thereby form a compact having a porosity of 10 to 30%; and sintering said compact while bringing the compact into contact with copper or copper alloy so that the copper or copper alloy is infiltrated into pores provided in the compact simultaneously with the sintering, whereby said chromium carbides are derived from said chromium and said graphite particles.

* * * * *